US012253439B2

(12) United States Patent
Reilly et al.

(10) Patent No.: US 12,253,439 B2
(45) Date of Patent: Mar. 18, 2025

(54) INTEGRATED PHASED ARRAY (IPA) THERMAL SUBSYSTEM FLUID LOOP SIMULATOR

(71) Applicant: The Boeing Company, Chicago, IL (US)

(72) Inventors: Creed Reilly, Chicago, IL (US); Gregory Kim, Chicago, IL (US); Jimmy Huynh, Chicago, IL (US); Kevin Nemeth, Chicago, IL (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 18/063,011

(22) Filed: Dec. 7, 2022

(65) Prior Publication Data

US 2024/0192094 A1 Jun. 13, 2024

(51) Int. Cl.
*F28D 15/00* (2006.01)
*F28F 9/02* (2006.01)
*F28F 19/01* (2006.01)
*G01M 99/00* (2011.01)

(52) U.S. Cl.
CPC ........... *G01M 99/002* (2013.01); *F28D 15/00* (2013.01); *F28F 9/0258* (2013.01); *F28F 19/01* (2013.01); *F28F 2280/10* (2013.01)

(58) Field of Classification Search
CPC ..... G01M 99/002; F28D 15/00; F28F 9/0258; F28F 19/01; F28F 2280/10
USPC .................................................... 165/104.31
See application file for complete search history.

(56) References Cited

U.S. PATENT DOCUMENTS 2,919,114 A * 12/1959 Birger ...................... F28G 9/00
165/DIG. 143

FOREIGN PATENT DOCUMENTS

| CN | 106 091 473 B | 9/2018 |
| CN | 112556448 A * | 3/2021 |
| RU | 2 209 751 C2 | 8/2008 |

OTHER PUBLICATIONS

Grohe, "Grohe Euphoria 310 Douchesystteem—techishe productifnormatie", Jun. 9, 2020, retrieved from Internet on Mar. 28, 2024 at URL:https://cdn.cloud.grohe.com/tpi/2000/2100/2170/2174/2174255/original/2174255.
Extended European Search Report prepared by the European Patent Office in application No. EP 23 21 3955 dated Apr. 22, 2024.

* cited by examiner

*Primary Examiner* — Davis D Hwu
(74) *Attorney, Agent, or Firm* — Yee & Associates, P.C.

(57) ABSTRACT

The present application relates to systems, methods, and apparatus for facilitating the testing of a payload. An exemplary apparatus may include a fluid inlet port configured to receive fluid from a thermal subsystem of the payload. The apparatus may also include an actuating device configure to supply the fluid to a heat exchanger. A valve may be configured to receive the fluid from the heat exchanger and separate the fluid into a first fluid line and a second fluid line. A first fluid outlet port may be configured to supply the fluid to the thermal subsystem of the payload and a second fluid outlet port may be configured to supply the fluid to the thermal subsystem of payload.

20 Claims, 9 Drawing Sheets

INTEGRATED PHASED ARRAY (IPA) THERMAL SUBSYSTEM FLUID LOOP SIMULATOR

FIELD

The present disclosure relates generally to testing of systems, and more particularly to facilitating the testing and verification of payloads or systems of a vehicle.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Vehicles may include many different types of systems or subsystems that provide designated functions for a vehicle, such as a spacecraft. For example, a spacecraft may have numerous payloads positioned throughout the spacecraft. The payloads of a spacecraft may include one or more antennas, which may be mounted in various locations on the spacecraft, support equipment, which may be carried in the fuselage, and extensive wiring that connects the antennas with the support equipment. The support equipment may include various trays and racks as well as computers, data processing hardware, data storage units, and the like.

During operation of a spacecraft, the payloads of a spacecraft may generate a relatively large amount of heat, which may be required to be dissipated to prevent damage to the payloads and/or to sustain operation of the spacecraft. To maintain the thermal environment of a payload in temperature ranges compatible with its operation and performance, it is usually necessary to use an on-board heat transfer system or coolant system to extract and collect heat from a thermal subsystem of the payload and then dissipate or evacuate the heat into space. The heat transfer system may include a fluid that circulates between a thermal subsystem of the payload in which heat is collected and a cooler area in which the heat absorbed by the fluid is dissipated or evacuated. The heat transfer system may utilize a pumped fluid loop (PFL) system for transporting and distributing the heated fluid and transferring or dissipating the heat from the fluid. The heat transfer system may have pumps and valves that are connected to fluid lines of the thermal subsystem of the payload.

The development of payloads for a spacecraft is typically distributed to a plurality of different manufacturers. The payloads may also be developed separately from the on-board heat transfer systems which dissipate heat for the payloads. Once the development and construction of the payloads and the on-board heat transfer systems are finished, the payloads and the heat transfer system may be transported and integrated together at a central or launch site to form the entire spacecraft system. The various payloads of the spacecraft are often interconnected by a highly complex plurality of electrical, mechanical, fluid carrying and thermal elements. These elements are routed in a complex arrangement to the various payloads of the spacecraft.

Typically, a payload of a spacecraft may not be tested until the payload is integrated with the on-board heat transfer system and/or with other payloads. Further, some payloads may not be able to be tested during development due to the lack of testing equipment for the design of the payload and the on-board heat transfer system may not be completely built and functional to enable testing of associated payloads.

However, once the construction of the payloads and on-board transfer system are completed, the payloads and on-board transfer system may be integrated and significant testing may be performed on the payloads before the spacecraft is ready for launch. For example, testing and verification may be performed on the operational characteristics of the payloads to determine compliance with the specification requirements and to mitigate risk to launch and orbit operations.

Once the payloads are integrated as part of the spacecraft, it may be difficult to isolate and test a particular payload. For example, if one or more payloads of the spacecraft needs to be accessed for additional testing, the payloads may not be capable of being quickly and easily disconnected. For example, the disassembly and uncoupling of a payload often requires extensive disassembly of cabling, mechanical coupling elements, fluid transfer lines and thermal elements, many of which are not capable of being quickly separated from their associated payload. Often, fluid lines need to be physically cut and then re-welded or re-brazed, and then pressure tested, during re-assembly. Thus, uncoupling and reassembly of even one payload often takes several days, or even weeks, to complete.

Further, the organization of the subsystems of the payload may not be arranged to facilitate additional testing. This may further contribute to extremely time consuming disassembly procedures being required before access can be gained to test a desired payload of the spacecraft. Often, a significant number of other unrelated payloads of the spacecraft may need to be removed before being able to access and test the desired payload. The inability to quickly and easily access and/or uncouple and physically remove or isolate a particular payload of the spacecraft introduces significant additional cost, in terms of labor, into the overall cost of manufacturing the spacecraft. It may also cause significant time delays which could jeopardize delaying a planned launch of the spacecraft if a portion of the spacecraft has to be disassembled, re-tested, and then reassembled shortly before a scheduled launch.

Therefore, it would be desirable to provide an apparatus for facilitating the testing of payloads prior to the integration of the payload into a spacecraft. It may also be beneficial to enable the functionally and operation of the payload to be tested without requiring the disassembly of numerous interconnecting components between payloads.

SUMMARY

The present application is directed to embodiments that relate to systems, methods, and apparatus for facilitating testing and verification of systems or payloads of a vehicle. The vehicle may include a spacecraft, such as a satellite or aerospace vehicle. The embodiments may be configured to be coupled to the payload of the vehicle and to receive a fluid or liquid from the payload. The fluid may be formulated to absorb heat generated by a thermal subsystem of the payload. The embodiments may be configured to distribute or transport the heated fluid away from the payload and then dissipate or remove the heat from the fluid. For example, the embodiments may receive heated fluid from a thermal subsystem of the payload and may circulate or distribute the heated fluid in one or more fluid paths or loops to dissipate or remove the heat from the fluid. Further, the embodiments may be used as a simulator to simulate conditions of the environment in which the payload may operate. For example, the embodiments may be configured to simulate thermal or heat conditions of the environment of a payload during space operations. The payload may be tested during the simulation of the thermal conditions by the embodiments.

The embodiments may enable testing operations to be performed on a payload during the development and manufacture of the payload. For example, the embodiments may facilitate testing of the payload as the payload progresses from the early stages of development through integrated testing. The embodiments may also enable the payload to be tested before the integration of the payload with the on-board heat transfer system and/or with other payloads developed at other locations. Further, the embodiments may enable testing operations of the payload to be performed at a facility of a payload developer rather than a launch or centralized site. For example, the testing of the payload may be conducted at the location of the payload developer prior to the transportation of the payload to the launch site. As a result, the embodiments may significantly shorten the overall time required to develop and test a payload, may improve testing efficiency, may decrease the dependency upon launch site infrastructure, and may reduce testing and development costs associated with the payload.

Further, the embodiments may have relatively simple designs and may be relatively inexpensive to manufacture. The embodiments may also be portable and relatively light weight, allowing an operator or technician to readily move the embodiments to various locations in a work area at a site of a payload developer. For example, the embodiments may be transported or moved to a location near the development and/or manufacture of a payload and may be coupled to the payload to monitor and simulate the thermal or heat conditions of the environment of the payload during space operations. The embodiments may also enable technicians to perform testing of the payload at ground level and at various payload developer sites. Additionally, the embodiments may be easily modified or reconfigured to adapt to different types and configurations of the thermal subsystems of a payload.

In one aspect, the present application discloses an apparatus for facilitating the testing of a payload. The apparatus may include a fluid inlet port configured to receive fluid from a thermal subsystem of the payload. The apparatus may also include an actuating device configured to supply the fluid to a heat exchanger. A valve may be configured to receive the fluid from the heat exchanger and separate the fluid into a first fluid line and a second fluid line. A first filter may be configured to filter the fluid in the first fluid line and a second filter may be configured to filter the fluid in the second fluid line. A first fluid outlet port may be configured to supply the fluid to the thermal subsystem of the payload and a second fluid outlet port may be configured to supply the fluid to the thermal subsystem of payload.

In another aspect, the present application disclosed a method for facilitating the testing of a payload. The method may include receiving fluid from a thermal subsystem of the payload and activating an actuating device to circulate fluid in one or more fluid lines. The method may also include changing a temperature of the fluid and separating the fluid into a first fluid line and a second fluid line. Further, the method may include supplying, via a first fluid outlet port, fluid to the thermal subsystem of the payload and supplying, via a second fluid outlet port, fluid to the thermal subsystem of the payload, wherein the second fluid outlet port is configured to be detachably coupled to the thermal subsystem of the payload.

In still another aspect, an apparatus for facilitating the testing of a payload is disclosed. The apparatus may include a first portable apparatus comprising at least a fluid inlet port, one or more heat exchangers, a first fluid outlet port, and a second fluid outlet port. The fluid inlet port may be configured to be detachably coupled to a thermal subsystem of the payload. The first fluid outlet port may be configured to be detachably coupled to the thermal subsystem of the payload and the second fluid outlet port may be configured to be detachably coupled to the thermal subsystem of the payload. The apparatus may also include a second portable apparatus having an inlet port and an accumulator. The inlet port of the second portable apparatus may be configured to be detachably coupled to the thermal subsystem of the payload.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
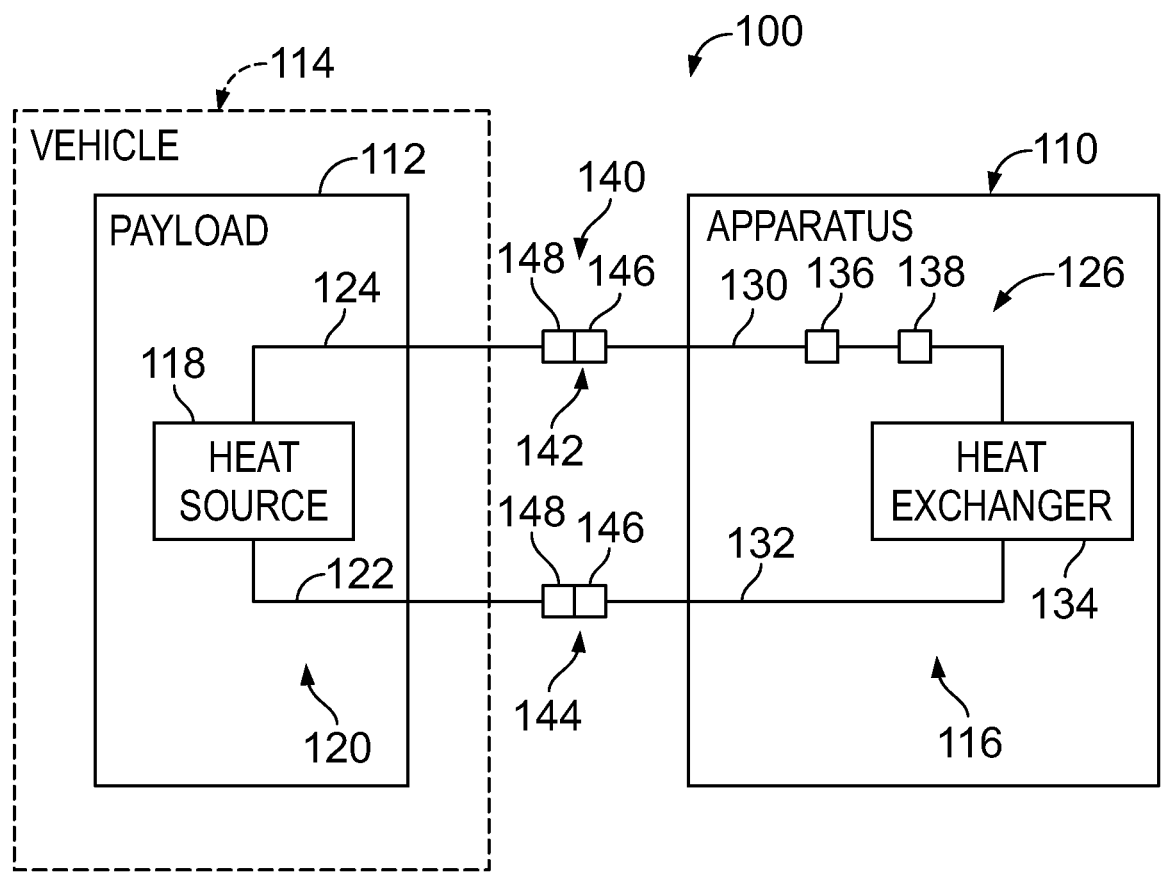
FIG. 1 illustrates a block diagram of a testing environment, according to an example implementation.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 5, fluid line are illustrated and associated with reference number 260. When referring to a particular one of the fluid lines, such as the fluid line 260A, the distinguishing letter "A" is used. However, when referring to any arbitrary one of fluid lines or to the fluid lines as a group, the reference number 260 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring now to the drawings, and more particularly to FIG. 1, a block diagram of a testing environment 100 is depicted in which embodiments of the present application may be implemented. As shown in FIG. 1, the testing environment 100 includes an apparatus 110 or assembly for facilitating the testing and verification of a payload 112 or a system of a vehicle 114. In some embodiments, the vehicle 114 may include a spacecraft, such as a satellite or aerospace vehicle. Alternatively, the vehicle 114 may be an aircraft, a land-based vehicle, a boat or water-based vehicle, or any other suitable vehicle.

The apparatus 110 may be configured to be coupled to or interface with the payload 112 of the vehicle 114 and to receive a fluid or liquid from a thermal subsystem of a payload. The fluid may be formulated to absorb heat generated by the thermal subsystem of the payload. The apparatus 110 may be configured to distribute or transport the heated fluid away from the payload 112 and then dissipate or remove the heat from the fluid. For example, the apparatus 110 may receive heated fluid from the payload 112 and may circulate or distribute the heated fluid in one or more fluid paths or loops to dissipate or remove the heat from the fluid. Further, the apparatus 110 may also be used as a simulator to simulate conditions of the environment in which the payload may operate. For example, the apparatus 110 may be configured to simulate thermal or heat conditions of the environment of a payload during space operations. The payload may be tested during the simulation of the thermal conditions by the apparatus 110.

The apparatus 110 may enable testing operations to be performed on the payload 112 during the development and manufacture of the payload 112. For example, the apparatus 110 may facilitate testing of the payload as the payload progresses from the early stages of development through integrated testing. The apparatus 110 may also enable the payload to be tested before the integration of the payload 112 with the on-board heat transfer system and/or with other payloads developed at other site locations. Further, the apparatus 110 may enable testing operations of the payload 112 to be performed at a facility of a payload developer rather than a launch or centralized site. For example, the testing of the payload 112 may be conducted at the location of the payload developer prior to transporting the payload 112 to the launch site. As a result, the apparatus 110 may significantly shorten the overall time required to develop and test a payload 112, may improve testing efficiency, may decrease the dependency upon launch site infrastructure, and may reduce testing and development costs of the payload 112.

Further, the apparatus 110 may have a relatively simple design and may be relatively inexpensive to manufacture. The apparatus 110 may also be portable and relatively light weight, allowing an operator or technician to readily move the apparatus 110 to various locations in a work area at a site of a payload developer. For example, the apparatus 110 may be transported or moved to a location near the development and/or manufacture of the payload and may be coupled to the payload to monitor and simulate thermal or heat conditions of the environment of the payload during space operations. The apparatus 110 may also enable technicians to perform testing of the payload at ground level and at various payload developer sites. Additionally, the apparatus 110 may be easily modified or reconfigured to adapt to different types and configurations of the thermal subsystem of a payload.

As shown in FIG. 1, the apparatus 110 may include a heat transfer system 116 (e.g., a heat exchange system, a cooling system, or the like) to received fluid from the payload 112 or system of a vehicle. The payload 112 may include a heat generating source 118 (e.g., a heat generating device) and a thermal subsystem 120 (e.g., a fluid transport system). The heat generating source 118 may generate heat of which dissipation from the payload 112 is desired. The heat generating source 118 of the payload 112 may be any heat-generating source (e.g., a component, a device, a system, an apparatus, or the like) forming part of the payload 112. For example, the heat generating source 118 may include one or more electrical or mechanical power-generating elements. In one implementation, the heat generating source 118 may include an antenna, such as an antenna array, that produces heat as a byproduct. The heat produced by the antenna may be significant enough that dissipation of the heat may be necessary to prevent damage to the payload 112 and/or to sustain operation of the associated vehicle, such as a spacecraft.

The thermal subsystem 120 of the payload 112 may be configured to be coupled to the heat transfer system of the apparatus 110. The thermal subsystem 120 may be configured to transfer heat from the heat generating source 118 to a fluid and to provide the heated fluid to the heat transfer system 116 of the apparatus 110. The thermal subsystem 120 may be configured to enable the fluid to flow through or in close proximity to the heat generating source 118 to capture or absorb heat from the heat generating source 118 and to provide the fluid to the heat transfer system 116 of the apparatus 110. In some embodiments, the thermal subsystem 120 may include one or more fluid lines integrated into the heat generating source 118 so as to promote efficient transfer of heat from the heat generating source 118 to the fluid in the one or more integrated fluid lines.

The thermal subsystem 120 of the payload 112 may be configured to be coupled to the heat transfer system 116 of the apparatus 110. As shown in FIG. 1, the thermal subsystem 120 of the payload 112 may include a fluid return line 122 (e.g., a fluid inlet line) and a fluid supply line 124 (e.g., a fluid outlet line). The fluid return line 122 and the fluid supply line 124 may be any suitable fluid lines or conduits. In one embodiment, the fluid return line 122 of the thermal subsystem 120 may be configured to be connected between the heat generating source 118 and the heat transfer system 116 of the apparatus 110. During operation, the fluid return line 122 of the thermal subsystem 120 may be configured to receive fluid from the heat transfer system 116 of the apparatus 110. The fluid supply line 124 of the thermal subsystem 120 may also be configured to be connected between the heat generating source 118 and the heat transfer system 116 of the apparatus 110. During operation, the fluid supply line 124 of the thermal subsystem 120 may be configured to provide or supply fluid to the heat transfer system 116 of the apparatus 110 after the fluid captures the heat from the heat generating source 118.

As shown in FIG. 1, the heat transfer system 116 of the apparatus 110 may be configured to be coupled to the thermal subsystem 120 of the payload 112. The heat transfer system 116 may be configured to enable the heat generated by the heat generating source 118 of the payload 112 to be distributed away from the payload 112 and dissipated. For example, the heat transfer system 116 of the apparatus 110 may be configured to receive heated fluid from the thermal subsystem 120 of the payload 112 and to dissipate the heat carried by the fluid.

The heat transfer system 116 of the apparatus 110 may include a fluid transmission system 126 (e.g., a fluid loop or circuit). The fluid transmission system 126 may be in fluid communication with the thermal subsystem 120 of the payload 112. For example, the fluid transmission system 126 may receive fluid from the fluid supply line 124 of the payload 112 and provide the fluid to the fluid return line 122 of the payload 112.

According to one embodiment shown in FIG. 1, the fluid transmission system 126 of the apparatus 110 may include a fluid inlet line 130, a fluid outlet line 132, and a heat exchanger 134 (e.g., a temperature adjustment system). The fluid inlet line 130 and the fluid outlet line 132 may be any suitable fluid lines or conduits. The fluid inlet line 130 may be coupled to and extend between an inlet of the heat exchanger 134 and the fluid supply line 124 of the thermal subsystem 120 of the payload 112. For example, the heat exchanger 134 may be in fluid communication with the thermal subsystem 120 of the payload 112. As such, the heat exchanger 134 may receive the fluid from the fluid inlet line 130 of the fluid transmission system 126. The heat from the fluid is transferred to the heat exchanger 134 from which the heat is ultimately dissipated from the heat generating source 118 of the payload 112. In some embodiments, the heat exchanger 134 may adjust or simulate the temperature of the fluid that is supplied to the thermal subsystem 120 of the payload 112.

After the fluid is circulated or passed through the heat exchanger 134, the fluid may be provided to the thermal subsystem 120 of the payload 112. The fluid outlet line 132 may be configured to be coupled to and extend between an outlet of the heat exchanger 134 and the fluid return line 122 of the thermal subsystem 120 of the payload 112. As such, the fluid is cycled between the heat generating source 118 and the heat exchanger 134 to promote the transfer of heat from the heat generating source 118 to the heat exchanger 134. Further, the fluid transmission system 126 may provide the fluid at a controlled or predetermined temperature and/or pressure to the thermal subsystem 120 of the payload 112.

The fluid transmission system 126 may also include a fluid regulation device 136 (e.g., a fluid or flow control device) and an actuation device 138, which may include a fluid pump. The fluid regulation device 136 may be operable to control the volumetric flow rate of the fluid through the fluid transmission system 126 of the apparatus 110. The operation of the actuation device 138 and the fluid regulation device 136 may be selectively controlled by a control system (e.g., a controller or processor) (not shown). For example, the control system may control the fluid regulation device 136 to adjust the volumetric flow rate of the fluid flowing through the fluid transmission system 126 to effectuate a desired heat transfer rate from the heat exchanger 134. The control system may also enable the fluid pressures generated within the fluid transmission system 126 to be measured and monitored during testing of the payload. For example, the fluid transmission system 126 may include a sensor system having sensors for measuring and monitoring the temperatures and pressure of the fluid in the fluid transmission system 126. In some embodiments, the fluid transmission system 126 may also include a fluid supply tank or fluid reservoir (e.g., an accumulator) (not shown) to hold fluid as further described below.

In some embodiments, referring to FIG. 1, a connection system 140 may be used to couple the fluid transmission system 126 of the apparatus 110 to the thermal subsystem 120 of the payload 112. The connection system 140 may include an inlet connection system 142 and an outlet connection system 144. The inlet connection system 142 can include any suitable connectors that may facilitate a sealed fluidic connection between the fluid inlet line 130 of the apparatus 110 and the fluid supply line 124 of the payload 112. Similarly, the outlet connection system 144 can include any suitable connectors that may facilitate a sealed fluidic connection between the fluid outlet line 132 of the apparatus 110 and the fluid return line 122 of the payload 112.

In one embodiment shown in FIG. 1, the inlet connection system 142 and the outlet connection system 144 may each include a first fitting 146 and a second fitting 148. The first fitting 146 may be selectively disconnectable from the second fitting 148 for quick and easy connection and disconnection between the first fitting 146 and the second fitting 148. As shown in FIG. 1, the first fitting 146 of the inlet connection system 142 may be coupled to the fluid inlet line 130 of the fluid transmission system 126 and the second fitting 148 of the inlet connection system 142 may be coupled to the fluid supply line 124 of the thermal subsystem 120. Similarly, the first fitting 146 of the outlet connection system 144 may be coupled to the fluid outlet line 132 of the fluid transmission system 126 and the second fitting 148 of the outlet connection system 144 may be coupled to the fluid return line 122 of the thermal subsystem 120.

Figure 2:
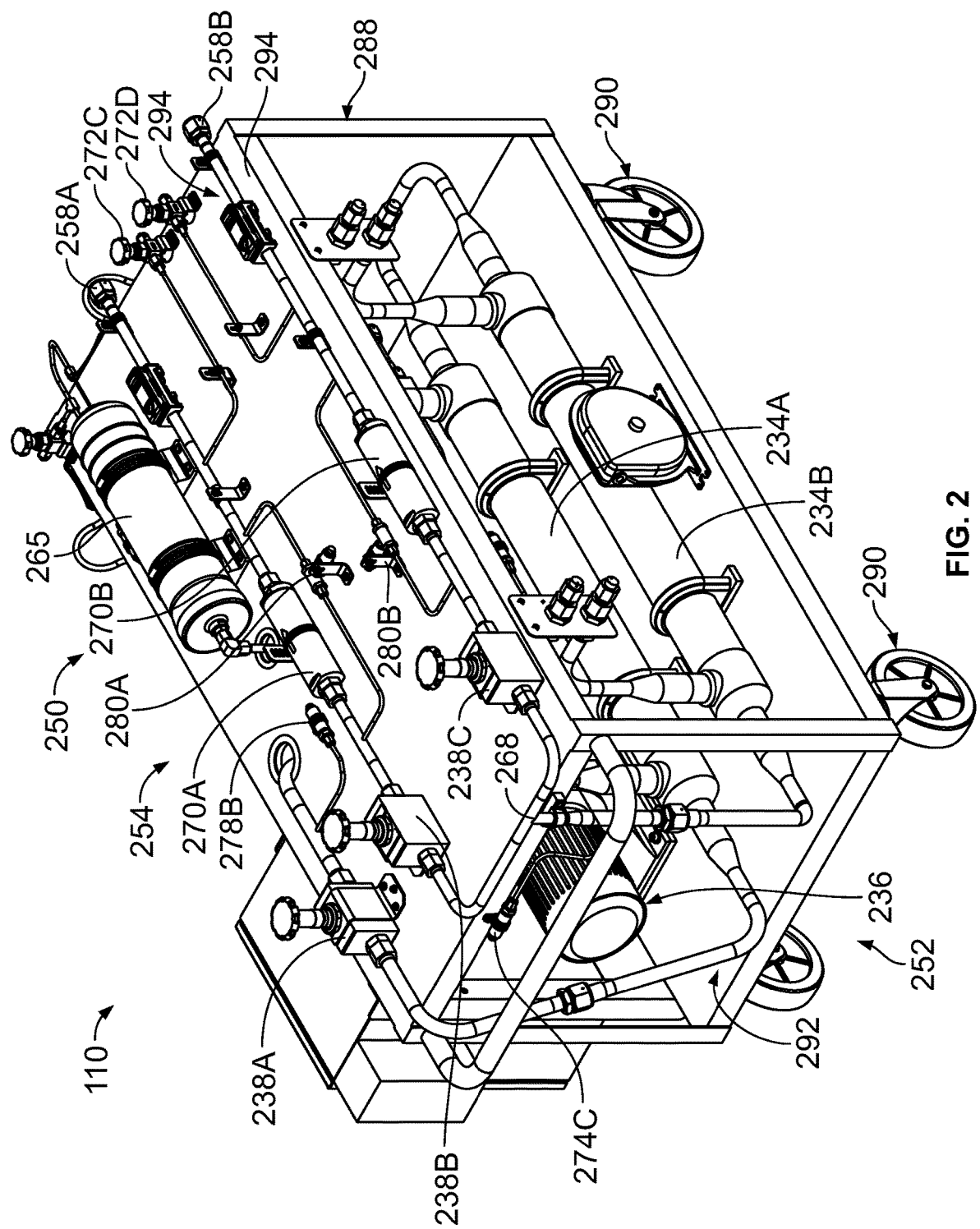
FIG. 2 illustrates a front perspective view of an embodiment of an apparatus for facilitating the testing of a payload or system, according to an example implementation.
Figure 3:
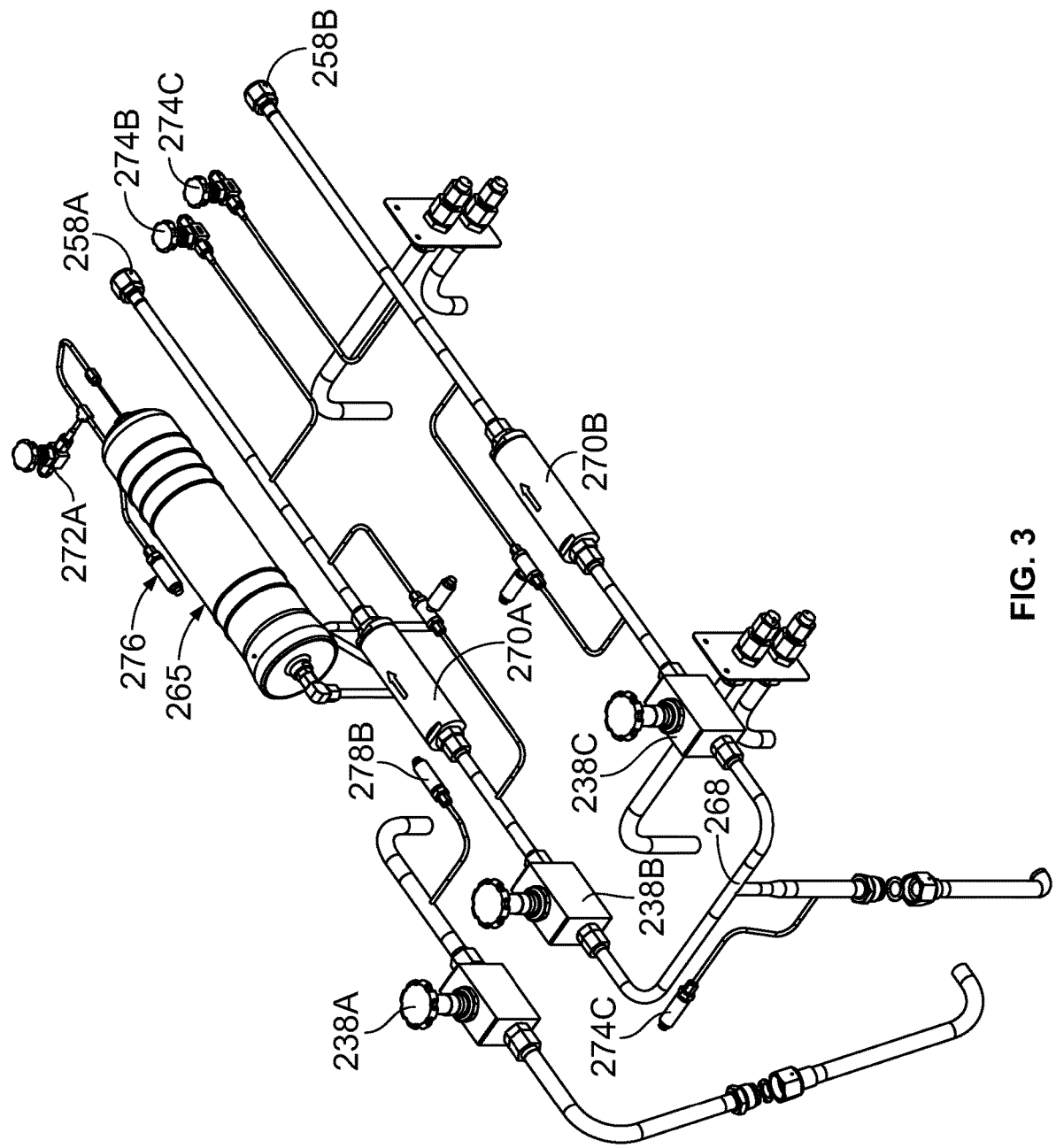
FIG. 3 illustrates a partial view of the embodiment of the apparatus taken of view A in FIG. 2.
Figure 4:
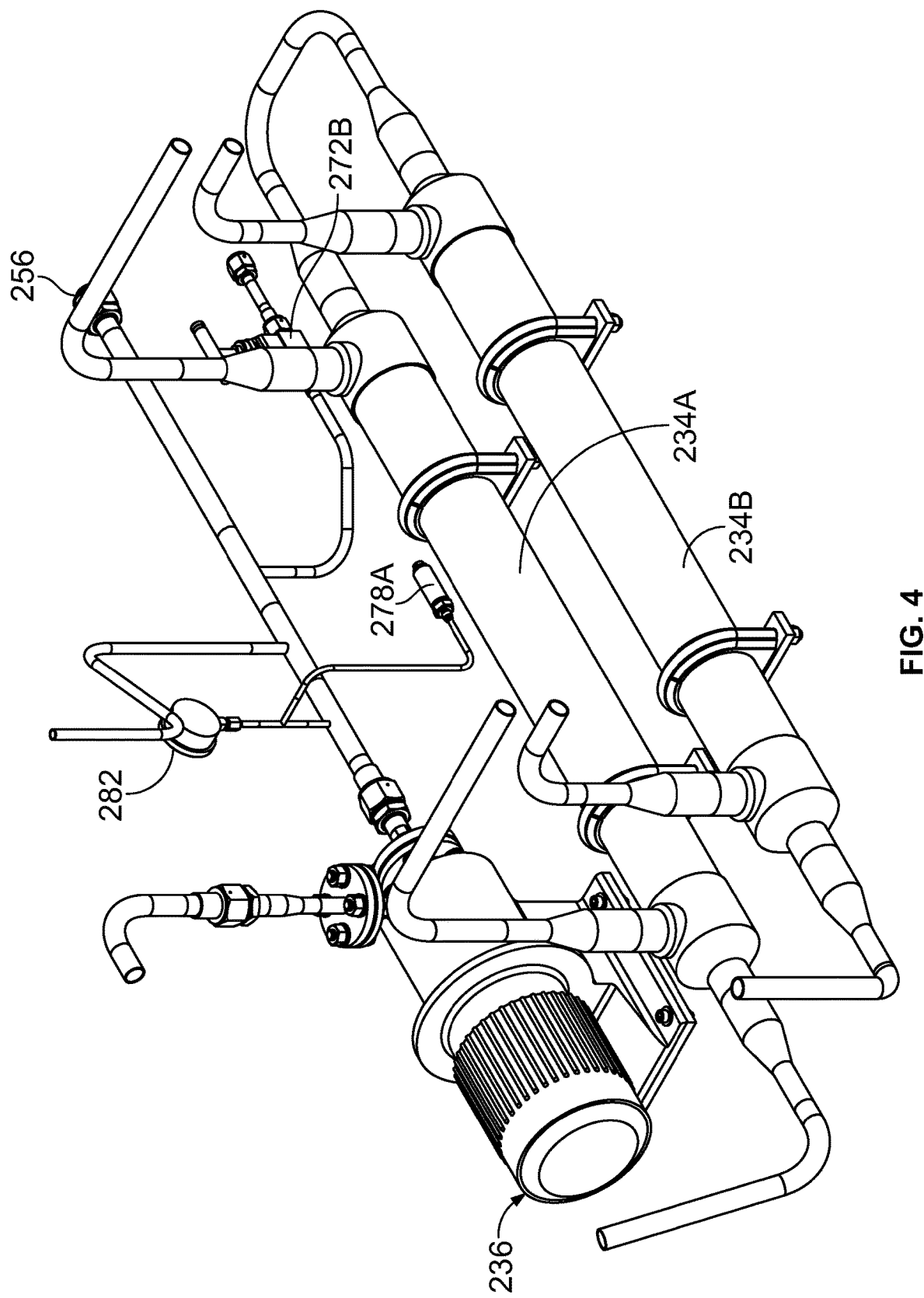
FIG. 4 illustrates a partial view of the embodiment of the apparatus taken of view B in FIG. 2.
Figure 5:
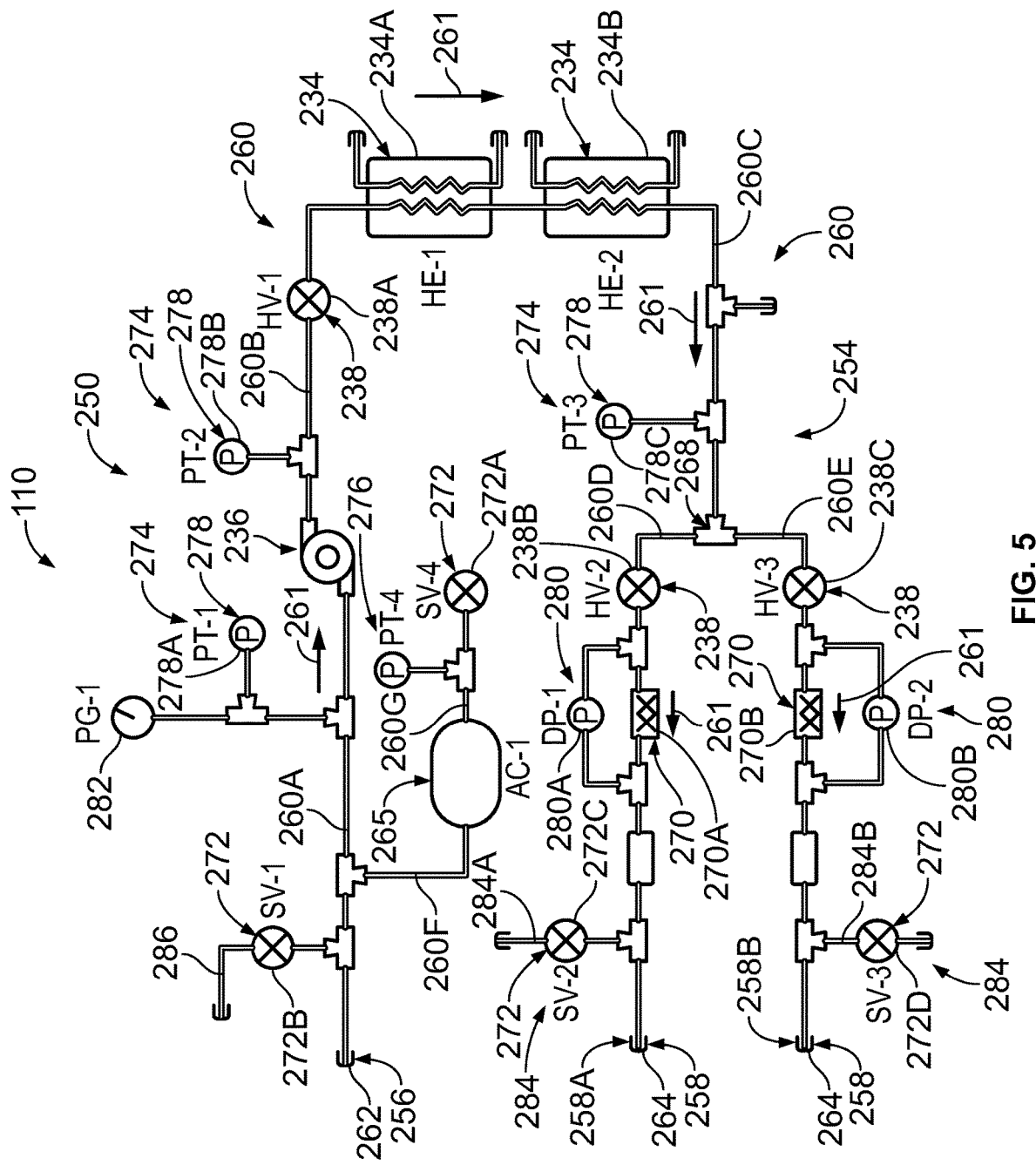
FIG. 5 is a schematic diagram of the embodiment of the apparatus of FIG. 2.

Referring now to FIGS. 2-5, an exemplary embodiment of the apparatus 110 is illustrated. FIG. 2 illustrates a front perspective view of the exemplary embodiment of the apparatus 110 for facilitating testing and verification of a payload or subsystem of a vehicle. A schematic diagram of the apparatus is shown in FIG. 5. In some embodiments, the apparatus 110 may be configured to facilitate the testing of payloads of a spacecraft. The apparatus 110 may be configured to interface with a payload and to receive a fluid or liquid from a thermal subsystem of the payload. The fluid may be formulated to absorb and capture heat generated by the thermal subsystem of the payload. The apparatus 110 may be configured to distribute or transfer the heated fluid from the payload and then dissipate or remove heat from the fluid. The apparatus 110 may also be used to simulate thermal or heat conditions of the environment in which the payload may operate. For example, the apparatus 110 may be configured to simulate thermal conditions of a payload of a vehicle, such as a spacecraft. The payload may be tested during the thermal conditions simulated by the apparatus 110.

The apparatus 110 may have a relatively simple design and may be relatively inexpensive to manufacture. The apparatus 110 may also be portable and relatively light weight, allowing an operator or technician to readily move the apparatus 110 to various locations in a work area at a site of a payload developer. For example, the apparatus 110 may be transported or moved to a location near the development and/or manufacture of the payload and may be coupled to the payload to monitor and simulate thermal or heat conditions of the environment for testing the payload. The apparatus 110 may also enable technicians to perform the testing of the payload at ground level and at various developer sites. Additionally, the apparatus 110 may be easily modified or reconfigured to adapt to different types and configuration of a fluid system of payloads.

As shown in FIG. 2, the apparatus 110 includes a heat transfer system 250 (e.g., a coolant system) and a mounting or supporting platform 252. The heat transfer system 250 may be configured to be coupled to a thermal subsystem (e.g., fluid lines) of a payload. The payload may be similar to the payload 112 of FIG. 1. The heat transfer system 250 may receive heated fluid from the thermal subsystem of the payload and may circulate the fluid in one or more fluid paths or loops to dissipate heat from the fluid. The heat transfer system 250 may include a fluid transmission system 254 to dissipate the heat.

According to one embodiment shown in FIGS. 2-5, the fluid transmission system 254 may include a fluid inlet port 256, one or more fluid outlet ports 258 (two being shown), fluid lines 260 or pipes, and one more fluid paths between the fluid inlet port 256 and the one or more fluid outlet ports 258. The fluid transmission system 254 may include any suitable number of fluid inlet and outlet ports. The fluid may be supplied to the fluid inlet port 256 from the thermal subsystem of the payload. Fluid may flow in a fluid flow direction as shown by arrows 261 from the fluid inlet port 256 through the fluid lines 260 of the fluid transmission system 254 to the fluid outlet ports 258. The fluid may be any of type of coolant or heat transfer fluid. For example, the fluid may be Therminol D-12 in some implementations. In other implementations, the fluid may be, for example, methyl alcohol, ethylene glycol, diethylene glycol, propylene glycol, polyalkylene glycol, nano-fluids, calcium chloride, and the like.

The fluid inlet port 256 of the fluid transmission system 254 may be configured to receive fluid from the thermal subsystem of the payload. For example, the fluid inlet port 256 may be configured to be coupled to a fluid supply line of the thermal subsystem of a payload. The fluid inlet port 256 may have any suitable sized diameter. The fluid inlet port 256 may include a fitting or coupling for connecting to the fluid supply line of the thermal subsystem of the payload. In one embodiment, the fluid inlet port 256 includes a quick disconnect coupling to allow for connecting and disconnecting the thermal system of the payload without draining or re-loading the fluid.

The fluid outlet ports 258 of the fluid transmission system 254 may enable the fluid to be supplied to the thermal subsystem of the payload. As shown in FIG. 2, each of the fluid outlet ports 258 may have a fitting or coupling, which facilitates attachment of the fitting to respective fluid return lines of the thermal subsystem of the payload. In one embodiment, the each of the fluid outlet ports 258 includes a quick disconnect coupling to allow for connecting and disconnecting the fluid outlet ports 258 to the thermal system of the payload without draining or re-loading the fluid.

As shown in FIG. 5, the fluid transmission system 254 of the heat transfer system 250 may also include heat exchangers 234, an actuating device 236, fluid regulation devices 238, an accumulator 265, a fluid splitter valve 268, filters 270, and shutoff valves 272. The shutoff valves 272 may be configured to regulate or control the flow of the fluid through the fluid transmission system 254 by fully opening or closing a passageway in a fluid line. For example, the shutoff valves 272 may each be adjustable between an open position to allow fluid to flow there-through and a closed position that prevents the flow of fluid. Each of the shut off valves may comprise a sample valve, a butterfly valve, a gate valve, a ball valve, a globe valve, or any other suitable valve.

The accumulator 265 of the fluid transmission system 254 may be configured to receive fluid from the fluid inlet port 256 of the fluid transmission system 254. The accumulator 265 may be coupled between the fluid inlet port 256 and the shutoff valve 272A. The accumulator 265 may allow for expansion and/or contraction of the fluid to prevent damage to the components of the fluid transmission system 254. Thus, the accumulator 265 may prevent hydraulic locking. The accumulator 265 may include a housing, an inlet, and an outlet. As shown, the inlet of the accumulator 265 may be fluidly coupled to the fluid inlet port 256 by the fluid line 260F and the outlet of the accumulator 265 may be fluidly coupled to the shutoff valve 272A by the fluid line 260G.

The actuating device 236 of the fluid transmission system 254 may be configured to receive fluid from the fluid inlet port 256 of the fluid transmission system 254 and to circulate or pump the fluid in one or more fluid paths. The actuating device 236 may be positioned between the fluid inlet port 256 and the fluid regulation device 238A. The actuating device 236 may include a housing, an inlet, and outlet. In one embodiment, the actuating device 236 may include a pump. As shown in FIG. 5, the inlet of the actuating device 236 may be fluidly coupled to the fluid inlet port 256 of the fluid transmission system 254 by the fluid line 260A and the outlet of the actuating device 236 may be fluidly coupled to the fluid regulation device 238A by the fluid line 260B. The actuating device 236 may be selectively activated or controlled by a control system as further described below.

The fluid regulation device 238A of the fluid transmission system 254 may be configured to receive fluid from the actuating device 236. The fluid regulation device 238A may be positioned between the heat exchanger 234A and the actuating device 236. In one embodiment, the fluid regulation device 238A may comprise a globe valve or any other suitable valve. As shown in FIG. 5, the fluid regulation device 238A may be fluidly coupled to the fluid line 260B. The fluid regulation device 238A may be configured to control the flow of the fluid receive from the actuating device 236 to the heat exchanger 234A. For example, the volumetric flow rate at which the fluid is transmitted through the fluid line 260B may be regulated by the fluid regulation device 238A. The fluid regulation device 238A may be selectively controlled by the control system as further described below.

The heat exchanger 234A of the fluid transmission system 254 may receive fluid from the fluid regulation device 238A. The heat exchanger 234A may be positioned between the fluid regulation device 238A and the heat exchanger 234B. In one embodiment, the heat exchanger 234A may be configured to heat or cool the fluid to simulate flight environmental conditions. The heat exchanger 234A may include a housing, an inlet, and an outlet. As shown in FIG. 5, the inlet of the heat exchanger 234A may be fluidly coupled the fluid regulation device 238A by the fluid line 260B and the outlet of the heat exchanger 234A may be fluidly coupled to the heat exchanger 234B.

The heat exchanger 234B of the fluid transmission system 254 may receive fluid from the heat exchanger 234A. The heat exchanger 234B may be positioned between the heat exchanger 234A and the fluid splitter valve 268. The heat exchanger 234B may be configured to heat or cool the fluid to simulate flight environmental conditions. The heat exchanger 234B may include a housing, an inlet, and an outlet. In one embodiment shown in FIG. 5, the inlet of the heat exchanger 234B may be fluidly coupled to the heat exchanger 234A and the outlet of the heat exchanger 234B may be fluidly coupled to the fluid splitter valve 268.

The fluid splitter valve 268 of the fluid transmission system 254 may receive fluid from the heat exchanger 234B. The fluid splitter valve 268 may split the flow of fluid into different fluid paths. For example, the fluid splitter valve 268 may split the fluid received from the heat exchanger 234B into a first and second fluid line or path. In the first fluid path, the fluid may flow through the fluid line 260D. Similarly, in the second fluid path, the fluid may flow through the fluid line 260E.

The fluid regulation device 238B of the fluid transmission system 254 may receive fluid from the fluid splitter valve 268. The fluid regulation device 238B may be positioned between the fluid splitter valve 268 and the filter 270A. In one embodiment, the fluid regulation device 238B may comprise a globe valve or any other suitable valve. As shown in FIG. 5, the fluid regulation device 238B may be fluidly coupled to the fluid line 260D. The fluid regulation device 238B may be configured to control the flow of the fluid through the fluid line 260D. For example, the volumetric flow rate at which the fluid is transmitted through the fluid line 260D may be regulated by the fluid regulation device 238B. The fluid regulation device 238B may be selectively controlled by the control system as further described below.

The fluid regulation device 238C of the fluid transmission system 254 may receive fluid from the fluid splitter valve 268. The fluid regulation device 238C of the fluid transmission system 254 may be fluidly coupled between the fluid splitter valve 268 and the filter 270B. In one embodiment, the fluid regulation device 238C may comprise a globe valve or any other suitable valve. As shown in FIG. 5, the fluid regulation device 238C may be fluidly coupled to the fluid line 260E. The fluid regulation device 238C may be configured to control the flow of the fluid through the fluid line 260E. For example, the volumetric flow rate at which the fluid is transmitted through the fluid line 260E may be regulated by the Fluid regulation device 238C. The Fluid regulation device 238C may selectively controlled by the control system as further described below.

The filters 270 of the fluid transmission system 254 may be configured to remove particular matter from the fluid. The filter 270A may be fluidly coupled to the fluid line 260D between the fluid regulation device 238B and the fluid outlet port 258A. The filter 270A may be an in-line filter including an inlet, an outlet, and a housing. In one embodiment shown in FIG. 5, the inlet of the filter 270A may be fluidly coupled to the fluid regulation device 238B and the outlet of the filter 270A may be fluidly coupled to the fluid outlet port 258A. Similarly, the filter 270B of the fluid transmission system 254 may be fluidly coupled to the fluid line 260E between the fluid regulation device 238C and the fluid outlet port 258B. The filter 270B may be an in-line filter including an inlet, an outlet, and a housing. As shown, the inlet of the filter 270B may be fluidly coupled to the fluid regulation device 238C and the outlet of the filter 270B may be fluidly coupled to the fluid outlet port 258B.

The fluid transmission system 254 may also include a sensor system. The sensor system of the fluid transmission system may include one or more sensors configured to measure and/or monitor the characteristics of the fluid in the fluid transmission system 254. The sensor system may include any number of suitable sensors. The sensors may be located at various positions along the fluid transmission system 254 and may be fluidly coupled to one of the fluid lines 260. The sensors may generate electrical signals as a function of a measured fluid characteristic. The sensors may send or transmission the electrical signal to the control system as further describer below.

The sensor system of the fluid transmission system may include pressure sensors 274 and a gas sensor 276. The gas sensor 276 may be fluidly coupled to the fluid line 260G between the accumulator 265 and the shutoff valve 272A. The gas sensor 276 may be configured to measure a gas pressure of the accumulator 265. The gas sensor 276 may also provide measurements to enable a fill position of the accumulator 265 to be determined. In one embodiment, the gas sensor 276 may include a gas pressure transducer.

The pressure sensors 274 of the sensor system may be used to monitor and measure the pressure of the fluid flowing through the fluid lines 260 at various locations of the fluid transmission system 254. The pressure sensors 274 may be in the form of liquid pressure transducers, delta pressure transducers, pressure gauges, or in some other known form. As shown in FIG. 5, the pressure sensors 274 may include three (3) liquid pressure transducers 278 and two (3) delta pressure transducer 280.

As shown in FIG. 5, the liquid pressure transducer 278A may be fluidly coupled to the fluid line 260A between the fluid inlet port 256 and the actuating device 236. The liquid pressure transducer 278A may be configured to measure the fluid pressure at the inlet of the actuating device 236. A pressure gauge 282 may be fluidly coupled to the liquid pressure transducer 278A. The liquid pressure transducer 278B may be fluidly coupled to the fluid line 260B between the outlet of the actuating device 236 and the fluid regulation device 238A. The liquid pressure transducer 278B may be configured to measure the fluid pressure at the outlet of the actuating device 236. The liquid pressure transducer 278C may be fluidly coupled between the outlet of the heat exchanger 234B and the fluid splitter valve 268. The liquid pressure transducer 278C may be configured to measure the fluid pressure at the outlet of the heat exchanger.

The delta pressure transducer 280A may be fluidly coupled to the fluid line 260D across the filter 270A. The delta pressure transducer 280A may be configured to measure the health of the filter 270A. Similarly, the delta pressure transducer 280B may be fluidly coupled to the fluid line 260C across of the filter 270B. The delta pressure transducer 280A may be configured to measure the heath of the filter 270B. In some embodiments, the fluid transmission system 254 may include temperature sensors, flow meters, or any other suitable sensor. For example, flow meters may be used to measure the flow rate of the fluid flow flowing through a fluid line of the fluid transmission system 254 and the temperature sensors may measure a temperature of the fluid flowing in the fluid transmission system 254.

The fluid transmission system 254 may also include one or more drain lines fluidly coupled to one or more of fluid lines 260 of the fluid transmission system 254. Each of the drain lines 284 may be configured to enable fluid to be drained from the fluid transmission system 254. As shown in FIG. 5, the fluid transmission system 254 may include two drain lines 284. The drain line 284A may be coupled to the fluid line 260D between the fluid outlet port 258A and the filter 270A. The shutoff value 272C may be fluidly coupled to the drain line 284A. Further, the drain line 284B may be coupled to the fluid line 260E between the fluid outlet port 258B and the filter 270B. The shutoff value 272D may be fluidly coupled to the drain line 284B. The fluid in the fluid transmission system 254 may be used for testing a plurality of payloads. Thus, the fluid may not be drained from the fluid transmission system 254 after using the apparatus 110 for testing a particular payload.

The fluid transmission system 254 of the heat transfer system 250 may also include a fill line 286 fluidly coupled to one of the fluid lines 260. The fill line 286 may be configured to enable fluid to be added to the fluid transmission system 254. As shown in FIG. 5, the fill line 286 may be coupled between the fluid inlet port 256 and the actuating device 236. The shutoff value 272B may be fluidly coupled to the fill line 286. In some embodiments, the fluid transmission system 254 may include one or more air bleed ports (not shown). Each air bleed port may be configured to prime the fluid transmission system 254 of the heat transfer system 250 to ensure no air is in the fluid transmission system 254 that may interfere with sensor readings, causing them to read incorrectly and/or to dampen fluid pressures.

In some embodiments, a control system (not shown) may be coupled to the heat transfer system 250 for monitoring and controlling the fluid in the fluid transmission system 254. The control system may be in electrical and/or electronic communication with the components of the fluid transmission system 254. The control system may receive and store data generated by the sensors of the sensor system during the testing of the payload. The control system may be microprocessor based such as a computer with a controller or central processing unit, a memory (RAM and/or ROM), and associated input and output buses. The controller may be in the form of an application-specific integrated circuit or may be formed of other logic devices known in the art. Further, the control system may include a user interface having a plurality of selectable options or inputs for controlling the components of the fluid transmission system 254 and/or simulating conditions of an environment of a payload. The user interface may also display the status of the components of the fluid transmission system 254 and the measurements of the sensors of the sensor system.

The control system may monitor the sensor data received from the sensors of the fluid transmission system 254. For example, the control system may analyze the sensor data to determine the status or conditions of the fluid at various locations in the fluid transmission system 254. For example, the control system may monitor the pressure and temperature of the fluid at a plurality of locations along the fluid transmission system 254. Based on the temperature and/or pressure of the fluid, the control system may cause the actuating device 236 to be activated or deactivate and/or may adjust the fluid regulation devices 238 to change the volume of the fluid flowing through the fluid transmission system 254. Further, the control system may monitor the performance of the actuating device 236 based on pressure increases or decreases between the inlet and outlet of the actuating device 236. When an anomalous condition is identified by the controller, an operator and/or service personnel may be notified. For example, an operator may be notified when the pressure or temperature of the fluid exceeds a threshold.

Referring now to FIG. 2, the mounting platform 252 (e.g., supporting platform) of the apparatus 110 allows an operator or technician to move the heat transfer system 250 to various locations of a work area, such as locations for conducting testing of a payload or system of a vehicle. For example, the mounting platform 252 may enable the heat transfer system 250 to be positioned at a location adjacent to a payload. In one embodiment, the mounting platform 252 may include a mobile apparatus, such as a cart.

As shown in FIG. 2, the mounting platform 252 includes a frame 288 and a plurality of wheels 290 coupled or attached to a bottom surface 292 of the frame 288. The frame 288 may have a rectangular configuration having opposing sides, a front, and a rear. The mounting platform 252 may also have a substantially flat or planar surface 294 that is positioned above the bottom surface 292 of the mounting platform 252. The plurality of wheels 290 may be attached to the bottom surface 292 of the mounting platform 252 to enable the apparatus 110 to be moved to a desired work area. It will be recognized that the mounting platform 252 can have various configurations to allow the apparatus 110 to be movable or portable. The mounting platform 252 may be composed of steel, aluminum, or any other suitable high-strength material.

Figure 6:
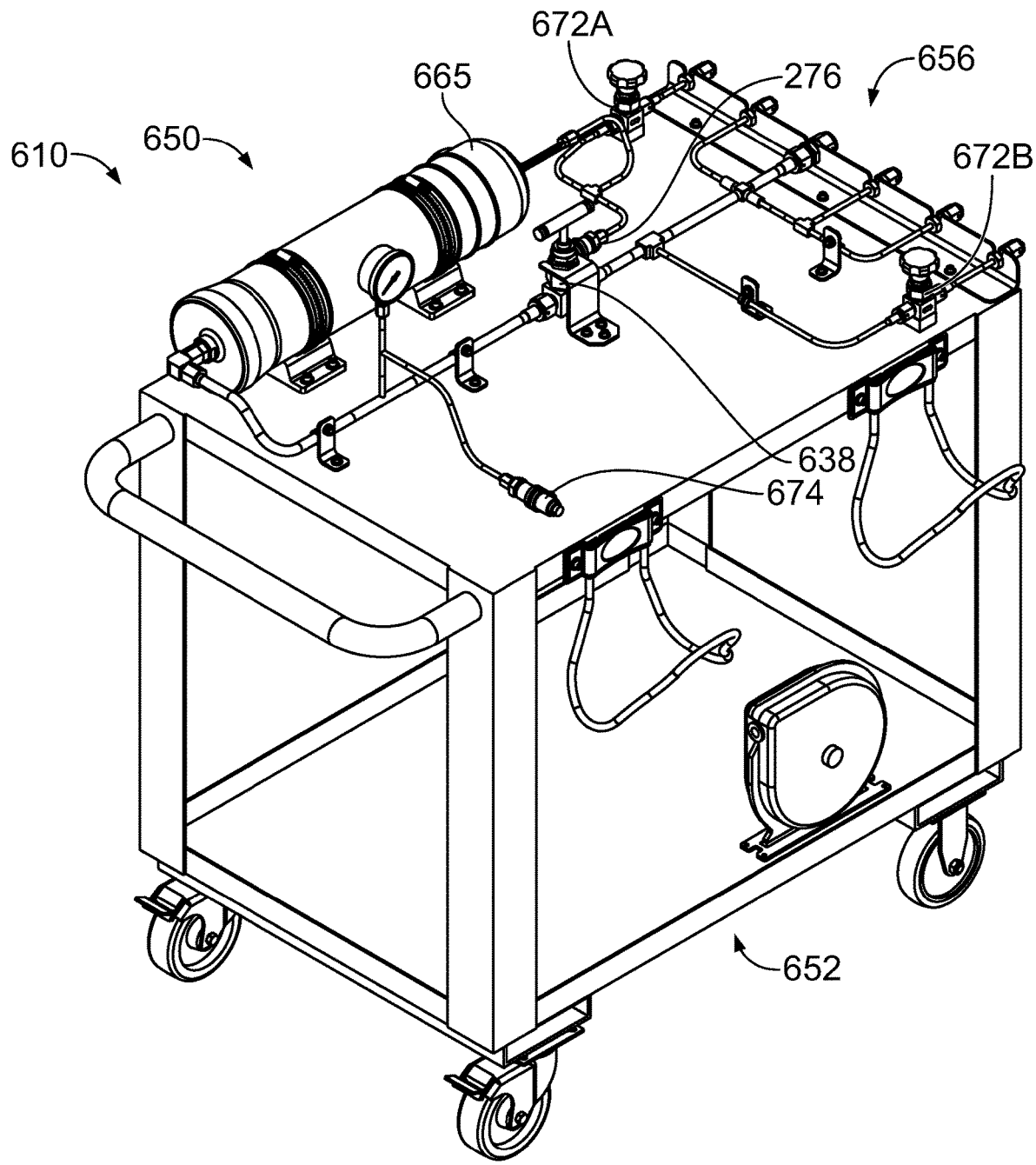
FIG. 6 illustrates a front perspective view of another embodiment of an apparatus for facilitating the testing of a payload or system, according to an example implementation.
Figure 7:
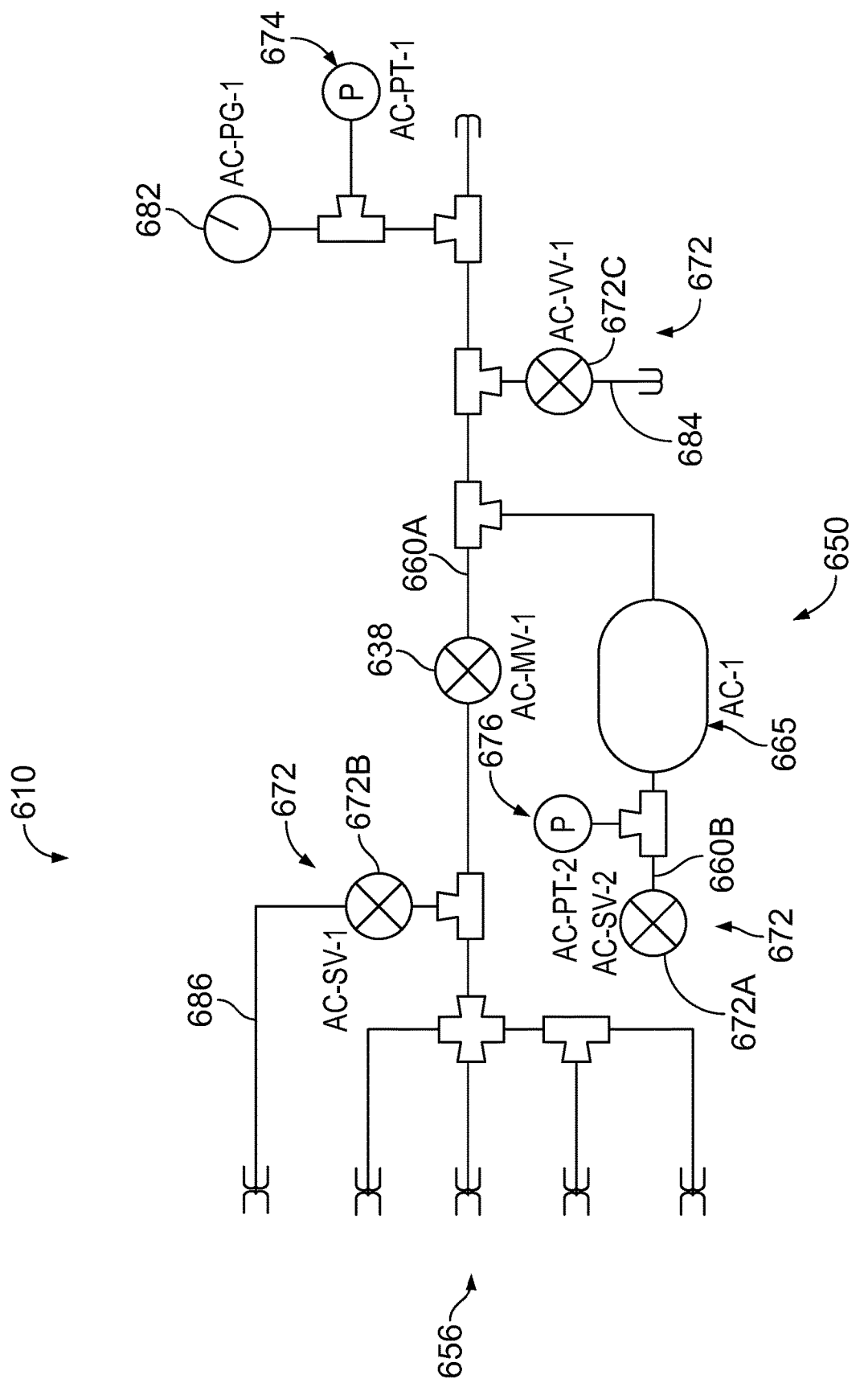
FIG. 7 is a schematic diagram of the embodiment of the apparatus of FIG. 6.
Figure 8:
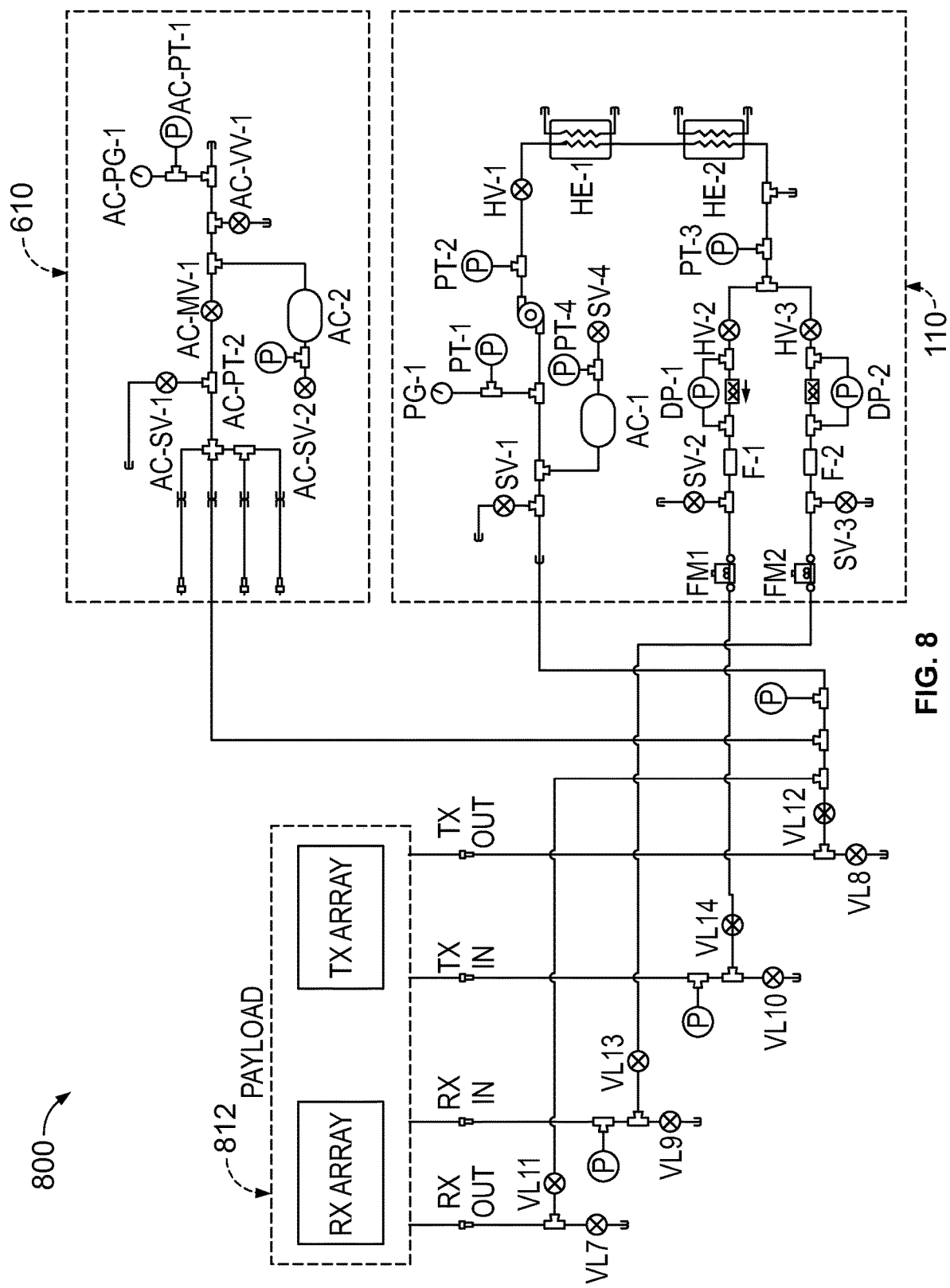
FIG. 8 is a schematic diagram of a testing environment for a payload, according to an example implementation.

Referring now to FIGS. 6 and 7, an exemplary embodiment of an apparatus 610 (e.g., an assembly) is illustrated. FIG. 6 illustrates a front perspective view of the exemplary embodiment of the apparatus 610 for facilitating the testing of payloads or systems. A schematic diagram of the apparatus is shown in FIG. 8. In some embodiments, the apparatus 610 may be configured to facilitate the testing of payloads of a spacecraft. In one embodiment, the apparatus 610 may include an umbilical cart. The apparatus 610 may be configured to interface with a thermal subsystem of the payload. The apparatus 610 may be configured to receive the fluid from the thermal subsystem of the payload and to provide fluid to the thermal subsystem of the payload.

The apparatus 610 may enable testing operations to be performed on a payload during the development and manufacture of the payload. For example, the apparatus 610 may facilitate testing of the payload as the payload progresses from the early stages of development through integrated testing. The apparatus 610 may also enable the payload to be tested before the integration of the payload with the onboard heat transfer system and/or with other payloads developed at other site locations. Further, the apparatus 610 may enable testing operations of the payload to be performed at a facility of a payload developer rather than a launch or centralized site. For example, the testing of the components of the payload may be conducted at the location of the payload developer prior to transporting the payload to the launch site. As a result, the apparatus 610 may significantly shorten the overall time required to develop and test a payload, may improve testing efficiency, may decrease the dependency upon launch site infrastructure, and may reduce testing and development costs of the payload.

The apparatus 610 may have a relatively simple design and may be relatively inexpensive to manufacture. The apparatus 610 may also be portable and relatively light weight, allowing an operator or technician to readily move the apparatus 610 to various locations in a work area at a site of a payload developer. For example, the apparatus 610 may be transported or moved to a location near the development and/or manufacture of the payload and may be coupled to the payload to monitor and simulate thermal or heat conditions of the environment for testing the payload. The apparatus 610 may also enable technicians to perform testing of the payload at ground level and at various developer sites. Additionally, the apparatus 610 may be easily modified or reconfigured to adapt to different types and configuration of a fluid system of payloads.

As shown in FIGS. 6 and 7, the apparatus 610 comprises a fluid system 650 and a mounting platform 652 (e.g., a supporting platform). The fluid system 650 may be configured to be coupled to a thermal subsystem (e.g., fluid lines) of a payload. The payload may be similar to the payload 112 of FIG. 1. The fluid system 650 may receive fluid from the thermal subsystem of the payload. The fluid may be any of type of coolant or heat transfer fluid. For example, the fluid may be Therminol D-12 in some implementations. In other implementations, the fluid may be, for example, methyl alcohol, ethylene glycol, diethylene glycol, propylene glycol, polyalkylene glycol, nano-fluids, calcium chloride, and the like.

The fluid system 650 may include a fluid regulation device 638 (e.g., a flow or fluid control device), fluid inlet ports 656, fluid lines 660 or pipes, an accumulator 665, and shutoff valves 672. As shown in FIG. 6, the fluid system 650 may include four fluid inlet ports 656. It will be recognized that the fluid system 650 may include any suitable number of fluid inlet ports 656. The fluid inlet ports 656 may be configured to receive fluid from a thermal subsystem of the payload. For example, each of the fluid inlet ports 656 may be configured to be coupled to a fluid supply line of the thermal subsystem of the payload. The fluid inlet ports 656 may have any suitable sized diameter. Each of the fluid inlet ports 656 may include a fitting or coupling for connecting to the thermal subsystem of the payload. In one embodiment, the fluid inlet ports 656 may include quick disconnect couplings to allow for connecting and disconnecting the fluid inlet ports 656 to the thermal system of the payload without draining or re-loading the fluid.

The shutoff valves 672 of the fluid system 650 may be configured to control the flow of the fluid through the fluid system 650 by fully opening or closing a passageway in a fluid line. For example, the shutoff valves 672 may be adjustable between an open position to allow fluid to flow there-through and a closed position that prevents the flow of fluid. Each of the shutoff valves 672 may comprise a butterfly valve, a gate valve, a ball valve, a globe valve, or any other suitable valve.

The fluid regulation device 638 of the fluid system 650 may be configured to receive fluid from one or more of the fluid inlet ports 656. As shown in FIG. 7, the fluid regulation device 638 may be fluidly coupled to the fluid line 660A. In one embodiment, the fluid regulation device 638 may comprise a needle valve or any other suitable valve. The fluid regulation device 638 may be configured to control the flow of the fluid receive from one or more of the fluid inlet ports 656. For example, the volumetric flow rate at which the fluid is transmitted through the fluid may be regulated by the fluid regulation device 638. The fluid regulation device 638 may be selectively controlled by a control system as further described below.

The accumulator 665 of the fluid system 650 may be configured to receive fluid from the fluid inlet ports 656. The accumulator 665 may be coupled between the fluid regulation device 638 and the shutoff valve 672A. The accumulator 665 may allow for expansion and/or contraction of the fluid to prevent damage to the components of the fluid system 650. Thus, the accumulator 665 may prevent hydraulic locking. The accumulator 665 may include a housing, an inlet, and an outlet. As shown, the inlet of the accumulator 665 may be fluidly coupled to the fluid regulation device 638 by the fluid line 660A and the outlet of the accumulator 665 may be fluidly coupled to the shutoff valve 672A by the fluid line 660B.

The sensor system of the fluid system 650 may include one or more sensors configured to measure and/or monitor the characteristics of the fluid in the fluid system 650. The sensor system may include any number of suitable sensors. The sensors may be fluidly coupled to one of the fluid lines 660. The sensors may generate electrical signals as a function of a measured fluid characteristic. The sensors may send or transmission the electrical signals to the control system as further describer below.

The sensor system of the fluid system may include a pressure sensor 674 and a gas pressure sensor 676. The gas pressure sensor 676 is fluidly coupled to the fluid line 660B between the accumulator 665 and the shutoff valve 672A. The gas pressure sensor 676 may be configured to measure a gas pressure of the accumulator 665. The gas pressure sensor 676 may also provide measurements to enable a fill position of the accumulator 665 to be determined. In one embodiment, the gas pressure sensor 676 may include a gas pressure transducer.

The pressure sensor 674 of the sensor system may be used to monitor and measure the pressure of the fluid flowing through the fluid line 660A of the fluid system 650. The pressure sensor 674 may be in the form of a liquid pressure transducer or in some other known form. As shown in FIG. 5, the pressure sensor 674 may be fluidly coupled to the fluid line 660A. The pressure sensor 674 may be configured to measure the fluid pressure at the inlet of the accumulator 665. A pressure gauge 682 may be fluidly coupled to the pressure sensor 674.

The fluid system may also include a drain line 684 fluidly coupled to the fluid line 660A of the fluid system 650. The drain line 684 may be configured to enable fluid to be drained from the fluid system 650. The shutoff value 672C may be fluidly coupled to the drain line 684. The fluid in the fluid system 650 may be used for testing a plurality of payloads. Thus, the fluid may not be drained from the fluid system 650 after using the apparatus for testing a particular payload.

The fluid system may also include a fill line 686 fluidly coupled to the fluid line. The fill line 686 may be configured to enable fluid to be added to the fluid system 650 during testing. The shutoff value 672B may be fluidly coupled to the fill line 686. In some embodiment, the fluid system 650 may include one or more air bleed ports (not shown). Each air bleed port may be configured to prime the fluid system 650 to ensure no air is in the fluid system 650 to interfere with sensor readings, causing them to read incorrectly and/or to dampen fluid pressures.

In some embodiments, a control system (not shown) may be configured to monitor and control the fluid in the fluid system 650. The control system may be in electrical and/or electronic communication with the components of the fluid system 650. The control system may receive and store data generated by the sensors of the sensor system during the testing of the payload. The control system may be microprocessor based such as a computer with a controller or central processing unit, a memory (RAM and/or ROM), and associated input and output buses. The controller may be in the form of an application-specific integrated circuit or may be formed of other logic devices known in the art. Further, the control system may include a user interface having a plurality of selectable options or inputs for controlling the components of the fluid system.

The control system may monitor the sensor data received from the sensors of the fluid system. For example, the control system may analyze the sensor data to determine the status or conditions of the fluid at various locations in the fluid system 650. For example, the control system may monitor the pressure and temperature of the fluid at a plurality of locations within the fluid system 650. Based on the temperature and/or pressure of the fluid, the control system may adjust the fluid regulation device 638 to change the volume of the fluid flowing through the fluid system 650. When an anomalous condition is identified by the control system, an operator and/or service personnel may be notified. For example, an operator may be notified when the pressure or temperature of the fluid exceeds a threshold.

Referring now to FIG. 8, a testing environment 800 is depicted in which the embodiments of the present application may be implemented. As shown in FIG. 8, the apparatus 110 of FIG. 2 and the apparatus 610 of FIG. 6 may be coupled to a payload 812 or subsystem. In one implementation, the payload 812 may include a receiving antenna array and a transmitting antenna array. The heat produced by the antennas may be significant enough that dissipation of the heat may be necessary to prevent damage to the payload.

As shown in FIG. 8, the apparatus 110 and the apparatus 610 may be coupled to the payload 812 and receive a fluid or liquid from the payload. The apparatus 110 may be configured to distribute or transport the fluid away from the payload 812 and then dissipate or remove the heat from the fluid as further described above. The apparatus 610 may be coupled to the payload to allow the fluid to expand and contract as further described above. As shown in FIG. 8, shut-off values and pressure sensors may be coupled to the fluid lines coupling the apparatus 110 and apparatus 610 to the payload 812.

Figure 9:
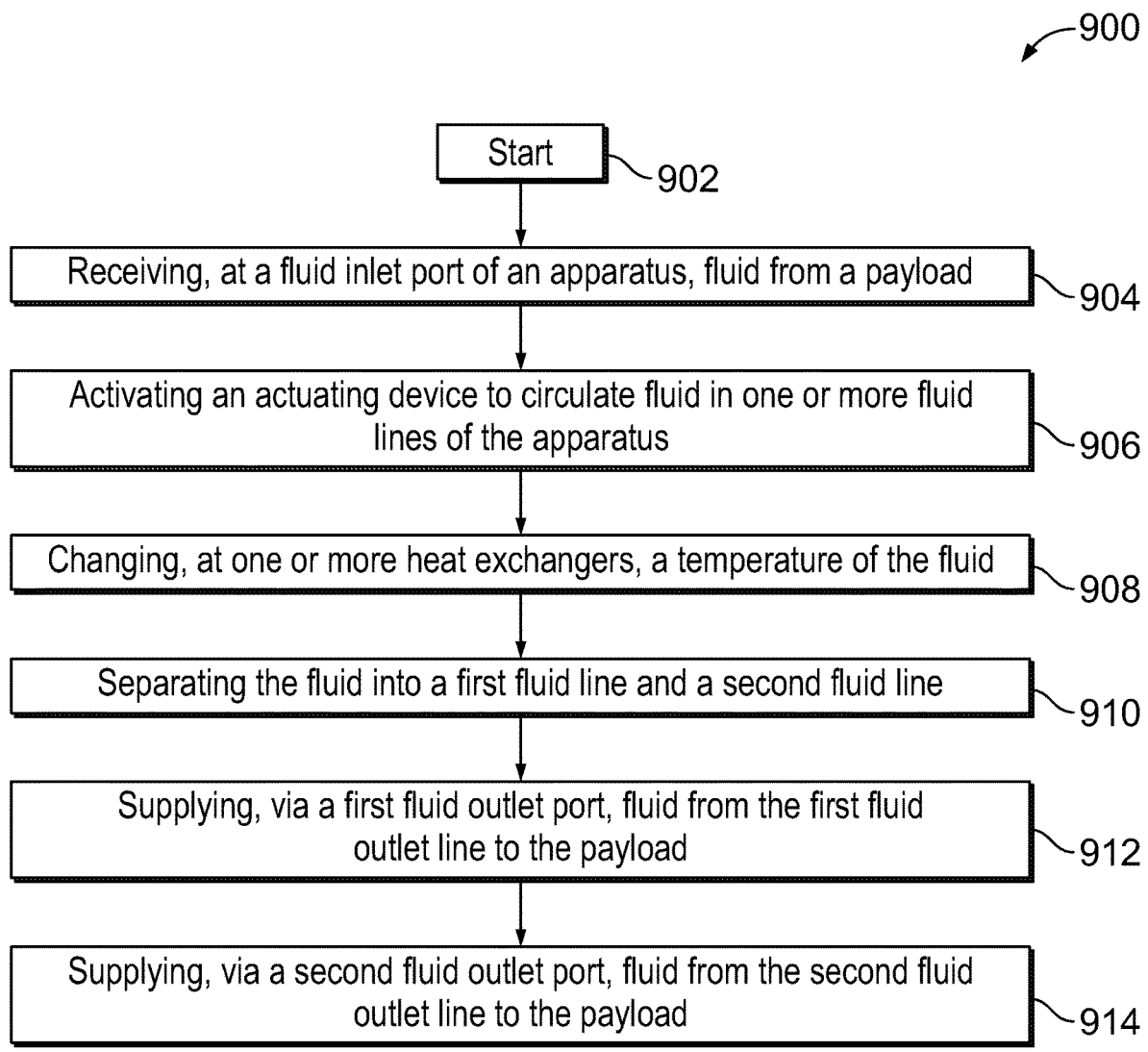
FIG. 9 illustrates a block diagram of a method, according to an example implementation.

FIG. 9 illustrates a flow chart of a method of using an apparatus for facilitating the testing of a payload of vehicle, according to an exemplary embodiment. The method 900 may include one or more operations, functions, or actions, as depicted by one or more of blocks 902-914, each of which may be carried out by any of the systems, methods, or apparatus shown in figures, among other possible systems. Alternative implementations are included within the scope of the example implementations of the present application in which operations, functions, or actions may be executed out of order from that shown or discussed, including substantially concurrent or in reverse order, depending on the functionality involved, as would be understood by those reasonably skilled in the art.

The method 900 may begin at block 902. The method 900 includes using an apparatus to facilitate the testing of a payload. The apparatus may include an assembly having a heat transfer system and a mounting platform, which may a portable or mobile apparatus. The heat transfer system may be configured to be operatively coupled to a payload under test. The payload under test may be configured to emulate conditions that the payload may be expected to experience during flight operations. The payload may include a thermal subsystem configured to capture and collect heat, using a fluid or liquid, generated by the payload and provide the fluid to the assembly.

At block 904, the apparatus may receive fluid from the payload. The apparatus may receive the fluid at a fluid inlet port. The fluid inlet port may be configured to be detachably coupled to a thermal subsystem of the payload. At block 906, an actuating device may be activated to circulate the fluid in one or more fluid lines of the assembly. A heat exchanger may receive the fluid from the actuation device. The fluid may be transmitted through the heat exchanger from an inlet of the heat exchanger to an outlet of the heat exchanger. At block 908, the heat exchanger may change or adjust the temperature of the fluid. In one embodiment, the temperature of the fluid entering the heat exchanger may be higher than the temperature of the fluid exiting the heat exchanger due to the dissipation of heat from the fluid as the fluid is transmitted through the heat exchanger.

At block 910, the fluid may be separated into a first fluid line and a second fluid line. For example, a fluid splitting valve of the apparatus may split the flow of fluid into a first path and a second path. At block 912, the fluid is supplied from the first fluid line to the payload. The fluid may be supplied to the payload through a first fluid outlet port of the apparatus. The first fluid outlet port may be configured to be detachably coupled to the thermal subsystem of the payload. At block 914, the fluid may be supplied from the second fluid line to the payload. The fluid may be supplied to the payload through a second fluid outlet port of the heat transfer system. The second fluid outlet port is configured to be detachably coupled to a second inlet line of the payload.

Although the vehicle and systems are described herein with specific reference to spacecraft and payloads, in other embodiments, the vehicle can be a vehicle other than a spacecraft and the system can be a system other than a payload without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An apparatus configured to test a payload, wherein the apparatus comprises:
    a fluid inlet port configured to receive fluid from a thermal subsystem of the payload, the fluid inlet port configured to be detachably coupled to the thermal subsystem of the payload;
    an actuating device in fluid communication with the fluid inlet port, the actuating device configured to provide fluid to a heat exchanger;
    a valve configured to receive the fluid from the heat exchanger, the valve configured to separate the fluid into a first fluid line and a second fluid line;
    a first filter configured to filter the fluid in the first fluid line;
    a second filter configured to filter the fluid in the second fluid line;
    an accumulator configured to receive and store fluid, wherein the accumulator is in fluid communication with the actuating device, and wherein the actuating device comprises a pump;
    a first fluid outlet port configured to supply the fluid from the first fluid line to the thermal subsystem of the payload, the first fluid outlet port configured to be detachably coupled to the thermal subsystem of the payload; and
    a second fluid outlet port configured to supply the fluid from the second fluid line to the payload, the second fluid outlet port configured to be detachably coupled to the thermal subsystem of the payload.

2. The apparatus according to claim 1, wherein the apparatus is portable, and further comprising a second heat exchanger configured to receive fluid from the heat exchanger, the second heat exchanger configured to change a temperature of the fluid.

3. The apparatus according to claim 1, further comprising a first fluid regulation device configured to control a flow of the fluid to the heat exchanger.

4. The apparatus according to claim 3, further comprising a gas sensor to measure a gas pressure of the accumulator.

5. The apparatus according to claim 1, further comprising a pressure sensor configured to measure a pressure of the fluid at an inlet of the actuating device.

6. The apparatus according to claim 1, further comprising a pressure sensor configured to measure a pressure of the fluid at an output of the actuating device.

7. The apparatus according to claim 1, further comprising a pressure sensor configured to measure a pressure of the fluid at an input of the valve.

8. The apparatus according to claim 3, further comprising a second fluid regulation device configured to control a flow of the fluid to the heat exchanger.

9. The apparatus according to claim 8, further comprising:
    a third fluid regulation device configured to control a flow of the fluid in the second fluid line.

10. The apparatus according to claim 1, further comprising:
    a first pressure sensor to measure a difference in pressure between an inlet and an outlet of the first filter; and
    a second pressure sensor to measure a difference in pressure between an inlet and an outlet of the second filter.

11. The apparatus according to claim 1, wherein the fluid inlet port is detachably coupled to the thermal subsystem of the payload by a first quick disconnect coupling, wherein the first fluid outlet port is detachably coupled to the thermal subsystem of the payload by a second quick disconnect coupling, and wherein the second fluid outlet port is detachably coupled to the thermal subsystem of the payload by a third quick disconnect coupling.

12. The apparatus according to claim 1, wherein the apparatus is configured to simulate conditions of an environment for testing the payload, and wherein the payload comprises at least one antenna array, a subsystem of an vehicle, or a payload of a spacecraft.

13. The apparatus according to claim 1, further comprising one or more wheels to enable the apparatus to be moved from a first location to a second location.

14. The apparatus according to claim 1, further comprising:
    a second apparatus comprising:
    a fluid inlet port configured to receive fluid from the payload, the fluid inlet port configured to be detachably connected to the thermal subsystem of the payload; and
    an accumulator configured to receive and store fluid from the payload, the accumulator in fluid communication with the thermal subsystem of the second apparatus, wherein the second apparatus is portable.

15. A method for facilitating testing of a payload, the method comprising:
- receiving, at a fluid inlet port of a portable apparatus, fluid from the payload, wherein the fluid inlet port is configured to be detachably coupled to a thermal subsystem of the payload;
- activating an actuating device to circulate fluid in one or more fluid lines of the portable apparatus;
- changing, at one or more heat exchangers of the portable apparatus, a temperature of the fluid;
- separating the fluid into a first fluid line and a second fluid line;
- supplying, via a first fluid outlet port of the portable apparatus, fluid to the thermal subsystem of the payload, wherein the first fluid outlet port is configured to be detachably coupled to the thermal subsystem of the payload;
- receiving, at a fluid inlet port of a second portable apparatus, the fluid from the thermal subsystem of the payload, wherein the fluid inlet port of the second portable apparatus is configured to be detachably coupled to the thermal subsystem of the payload;
- storing a portion of the fluid in an accumulator of the second portable apparatus; and
- supplying, via a second fluid outlet port of the portable apparatus, fluid to the thermal subsystem of the payload, wherein the second fluid outlet port is configured to be detachably coupled to the thermal subsystem of the payload.

16. The method according to claim 15, further comprising controlling a rate of fluid flow through the first fluid line.

17. The method according to claim 15, further comprising controlling a rate of fluid flow through the second fluid line.

18. The method according to claim 17, further comprising measuring a fluid pressure of the accumulator.

19. The method according to claim 15, further comprising measuring a pressure of the fluid at an inlet of the actuating device.

20. An apparatus configured to test a payload, wherein the apparatus comprises:
- a first portable apparatus comprising at least a fluid inlet port, one or more heat exchangers, a first fluid outlet port, and a second fluid outlet port, wherein the fluid inlet port is configured to be detachably coupled to a thermal subsystem of the payload, wherein the first fluid outlet port is configured to be detachably coupled to the thermal subsystem of the payload, and wherein the second fluid outlet port is configured to be detachably coupled to the thermal subsystem of the payload; and
- a second portable apparatus having an inlet port and an accumulator, wherein the inlet port of the second portable apparatus is configured to be detachably coupled to the thermal subsystem of the payload.

* * * * *